United States Patent [19]

Matsui

[11] Patent Number: 5,734,684
[45] Date of Patent: Mar. 31, 1998

[54] DEMODULATION DEVICE AND COMMUNICATION PROCESSING APPARATUS PROVIDED WITH SAME

[75] Inventor: Hisayoshi Matsui, Kawasaki, Japan

[73] Assignee: Canon Kabushiki Kaisha, Tokyo, Japan

[21] Appl. No.: 430,163

[22] Filed: Apr. 27, 1995

Related U.S. Application Data

[63] Continuation of Ser. No. 208,086, Mar. 9, 1994, abandoned, which is a continuation of Ser. No. 836,912, Feb. 19, 1992, abandoned.

[30] Foreign Application Priority Data

Feb. 22, 1991 [JP] Japan ............... 3-028228

[51] Int. Cl.$^6$ ............................................. H04L 27/06
[52] U.S. Cl. ...................... 375/340; 375/342; 375/368; 375/370; 375/222
[58] Field of Search ....................... 375/340, 342, 375/324, 362, 365, 366, 368, 369, 370, 222, 223

[56] References Cited

FOREIGN PATENT DOCUMENTS 0166274 1/1986 European Pat. Off. .
0269974 6/1988 European Pat. Off. .

OTHER PUBLICATIONS

Proc.IEEE VLSI and Computer Peripherals, May 8, 1989, pp. 5146–5147 Ungan et al. "A 128-bit microprocessor compatible programmable correlator chip for use in synchronous communication."

Electronics.DE 1984 A 1985: Electronics Week, Oct. 23, 1980, p. 260, "Chip looks for 64-bit word".

*Primary Examiner*—Don N. Vo
*Attorney, Agent, or Firm*—Fitzpatrick, Cella, Harper & Scinto

[57] ABSTRACT

In a demodulation device for processing a received data including a predetermined pattern, at each m bits, a bit pattern including the predetermined pattern is set, and the received data is shifted by one bit each time. A result of the shift is compared with the set bit pattern each time shifting is performed. The result of the shift is output in the case where coincidence is obtained. In the case where coincidence cannot be obtained, comparison is continued.

21 Claims, 7 Drawing Sheets

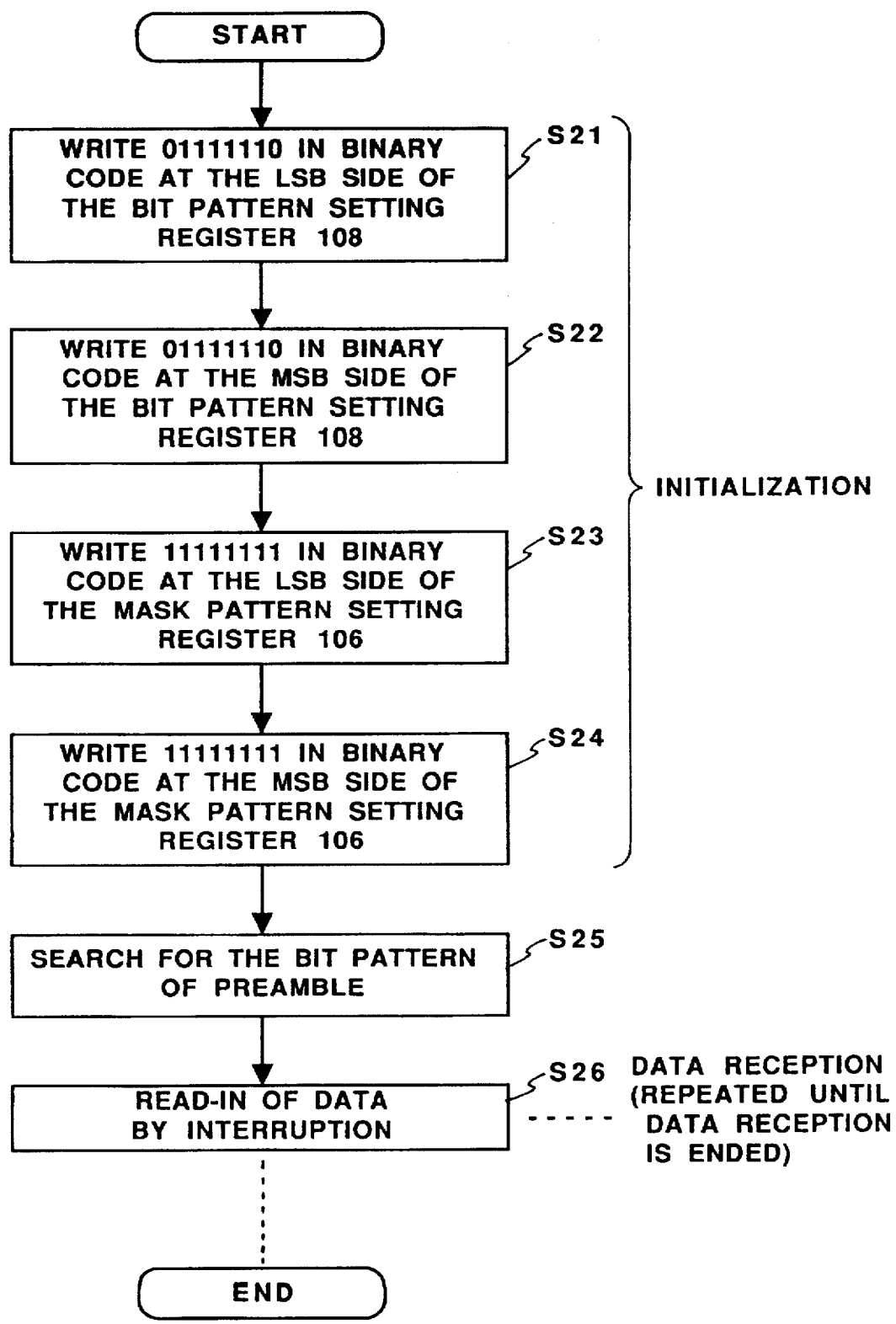
F I G. 6

MSB            LSB  MSB                    LSB

0111111111111000  ,  0100000000000000

EFFECTIVE BITS         EOL

FIG. 7

DEMODULATION DEVICE AND COMMUNICATION PROCESSING APPARATUS PROVIDED WITH SAME

This application is a continuation of application Ser. No. 08/208,086 filed on Mar. 9, 1994, abandoned which is a continuation of Ser. No. 07/836,912 filed on Feb. 19, 1992 abandoned.

BACKGROUND OF THE INVENTION

1. Field of the Invention

The present invention relates to a demodulation device having a parallel interface for connecting a microprocessor and others, and a communication processing apparatus provided with such a demodulation device.

2. Description of the Related Art

Data reception operation in a conventional facsimile will be described below with reference to FIG. 1 which illustrates the connection between a modem and a micro processing unit (MPU) which is a host processor.

First, a signal is input from a transmission line located on the left through a modem 302. An analog interface unit 306 performs band-pass filtering on the input signal. The resultant signal is converted into a digital signal and then input to a reception unit 305. The reception unit 305 performs on the digital signal demodulation, equalization and determination, and serially outputs the received data synchronously with data clocks. The serial data is converted into parallel data (which may be in 8 bits) by a serial/parallel converting unit 303, and is then transferred to an interface register 304. At that time, the modem 302 outputs an interrupt request signal to a MPU 301 which is a host processor. When the interrupt request signal is input to a control unit 307, the MPU 301 reads in the received data from the interface register 304 of the modem 302 to registers 306a and 306b via a data bus. Series of the aforementioned operations are repeated each time data is received in 8 bits.

The operation of the transmission side will be described below with reference to FIG. 2. First, a MPU 401 on the transmission side writes in transmission data of first 8 bits to an interface register 404. The transmission data is converted into serial data by means of a parallel/serial converting unit 403. A transmission unit 405 performs signal processing on the resultant serial data, and an analog interface unit 406 converts the serial data into an analog signal. A low-pass filters the analog signal before the signal is output to the transmission line.

The data written in the interface register 404 is transferred to the parallel/serial converting unit 403 when all the data in the parallel/serial converting unit 403 has been transferred to the transmission unit 405. At that time, an interrupt request signal is output to the MPU 401. A control unit of the MPU 401 is interrupted by the interrupt request signal, and thereby outputs, to the interface register 404, the 8-bit data which is to be transmitted subsequently. Series of the aforementioned operations are repeated for every 8-bit transmission data.

The operation performed on the transmission side will be compared with that performed on the reception side. The 8-bit data written on the transmission side is not always reproduced in the interface register 404 on the reception side as it is. Also, assuming that there is no transmission error caused by deformation or noise inherent to the transmission circuit, a bit shift may occur in the received data due to the difference in the transmission and reception operation timings. Hence, to allow the data transmitted from the transmission side in one-byte units to be received at the reception side in one-byte units, 2-byte registers (which may be denoted by 306a and 306b) are conventionally prepared at the reception side. To correct the shift, a software capable of searching for a pattern for synchronization (hereinafter referred to as a synchronizing pattern) by shifting the data by one bit each time is used.

The procedures of the reception software, which is conducted when the synchronizing pattern is in 8 bits, will be described below with reference to FIG. 3. In step (hereinafter referred to as a S) S1 through S6, which will be described below, reading of the data is repeated by interruption until 8-bit data which coincides with the synchronizing pattern is read in. First, in S1, 0 is assigned to a counter (SHFTCNT) for counting the number of shifted bits. In S2, data is read from the interface register 304 of the modem to the registers 306a and 306b by interruption. In S3, the data in the registers 306a and 306b are shifted to the right by 1 bit, and then in S4, the contents in SHFTCNT are incremented. Thereafter, in S5, the contents in SHFTCNT are compared with 8. If the contents in SHFTCNT are less than 8, the process goes to S6. In S6, the contents in the register 306b are compared with the synchronizing pattern. If they do not coincide with each other, the process returns to S3 and the processing from S3 to S6 is repeated. If the synchronizing pattern is not found after the aforementioned operation is repeated eight times, i.e., if the contents in SHFTCNT are greater than 8, the process returns to S1, and the processing from S1 to S6 is conducted on new 8-bit received data. The processing from S1 to S6 is repeated until the 8-bit data corresponding to the synchronizing pattern is found (searched for). If the 8-bit data corresponding to the synchronizing pattern has been found in S6, the processing in S7 and subsequent steps is performed. In S7 and subsequent steps, bit shift in the received data is adjusted, and data is read in repetitively by interruption. In S7, the data in the registers 306a and 306b are shifted to the right by "8 bits—the contents in SHFTCNT". Next, in S8, data is read in to the register 306a by interruption. Thereafter, the contents of the registers 306a and 306b are shifted by the number of bits which correspond to the contents of SHFTCNT so as to allow the 8-bit data transmitted immediately after the 8-bit data corresponding to the synchronizing pattern to be written in the register 306b. Data can be read out from the register 306b in 8 bit units as it is transmitted from the transmission side by repeating the processing from S7 through S10.

In the aforementioned conventional modem, since the timing of the parallel output of the received data from the modem is undefined, a complicated task by a software which enables the MPU for processing the received data to search for the bit pattern is necessary. Furthermore, it is necessary for the MPU to execute a troublesome task of shifting the received data.

SUMMARY OF THE INVENTION

An object of the present invention is to provide a demodulation device which is capable of overcoming the drawbacks of the conventional techniques.

An object of the present invention is to provide a communication processing apparatus which is capable of overcoming the drawbacks of the conventional techniques.

Another object of the present invention is to provide a demodulation device which is capable of greatly alleviating the burden of the software executed by an external circuit, such as a MPU, to control a modem.

Still Another object of the present invention is to provide a communication processing apparatus which is capable of greatly alleviating the burden of the software executed by an external circuit, such as a MPU, to control a modem.

Still another object of the present invention is to provide a demodulation device for processing a received data, which are headed with a pattern used for synchronization, which comprises setting means for setting a bit pattern including the pattern for synchronization, shifting means for shifting the received data by one bit each time, comparison means for comparing the received data shifted by the shifting means with the bit pattern set by the setting means each time shifting is performed by the shifting means, output means for outputting a result of the shift by the shifting means in the case where coincidence is obtained by the comparison means, and continuing means for continuing the operation of the comparison means in the case where coincidence cannot be obtained by the comparison means.

A further object of the present invention is to provide a communication processing apparatus including a demodulation device for processing a received data, which are headed with a pattern used for synchronization and an inner processing device. The demodulation device comprises setting means for setting a bit pattern including the pattern for synchronization, shifting means for shifting the received data by one bit each time, comparison means for comparing the received data shifted by the shifting means with the bit pattern set by the setting means each time shifting is performed by the shifting means, transfer means for transferring a result of the shift by the shifting means to the inner processing device in the case where coincidence is obtained by the comparison means, and continuing means for continuing the operation of the comparison means in the case where coincidence cannot be obtained by the comparison means.

Other features and advantages of the present invention will be apparent from the following description taken in conjunction with the accompanying drawings, in which like reference characters designate the same or similar parts through the figures thereof.

BRIEF DESCRIPTION OF THE DRAWINGS

FIG. 6 is a flowchart showing the procedures for receiving a preamble in the embodiment shown in FIG. 4; and FIG. 7 illustrates how a mask pattern and a bit pattern are set in the embodiment shown in FIG. 4.

DETAILED DESCRIPTION OF THE PREFERRED EMBODIMENTS

An embodiment of the present invention will be described below in detail with reference to the accompanying drawings.

Figure 1:
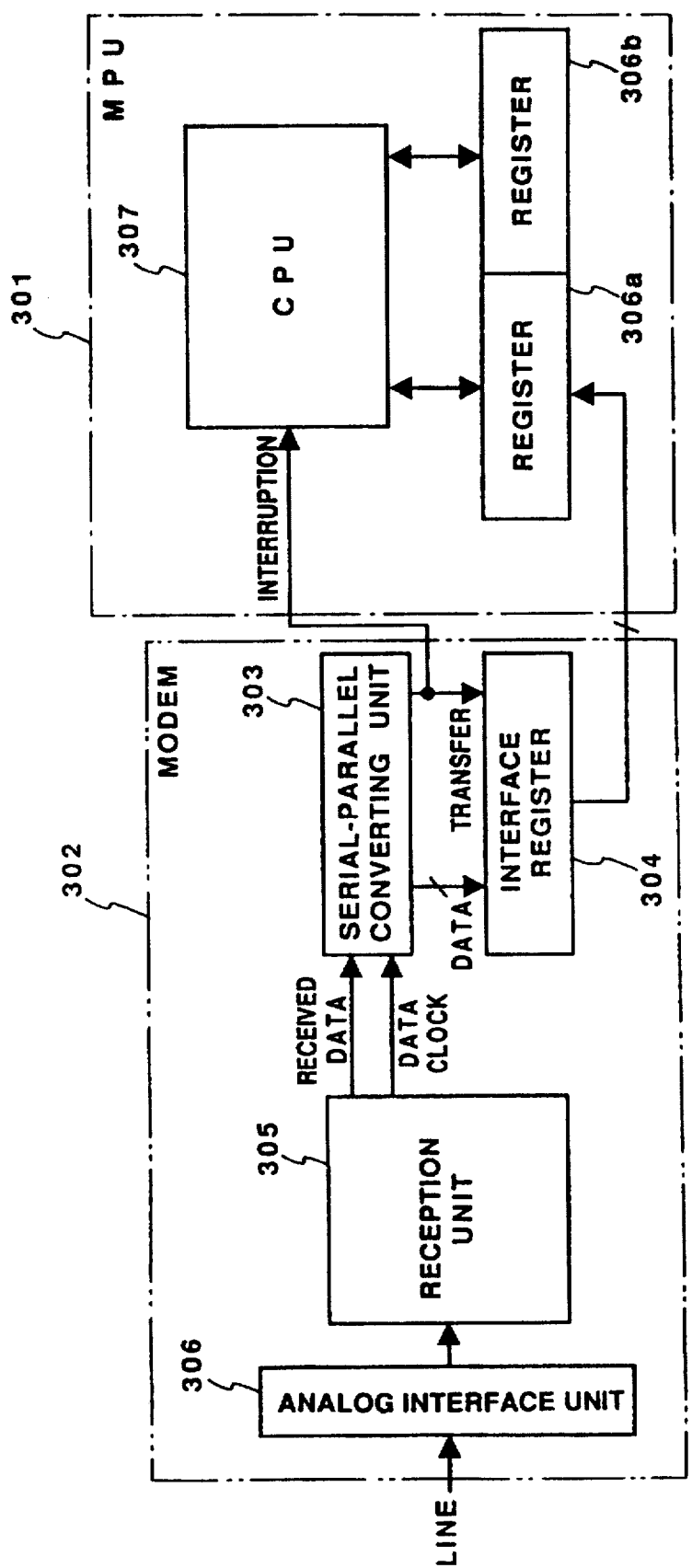
FIG. 1 is a block diagram showing a conventional structure for reception in a facsimile machine.
Figure 2:
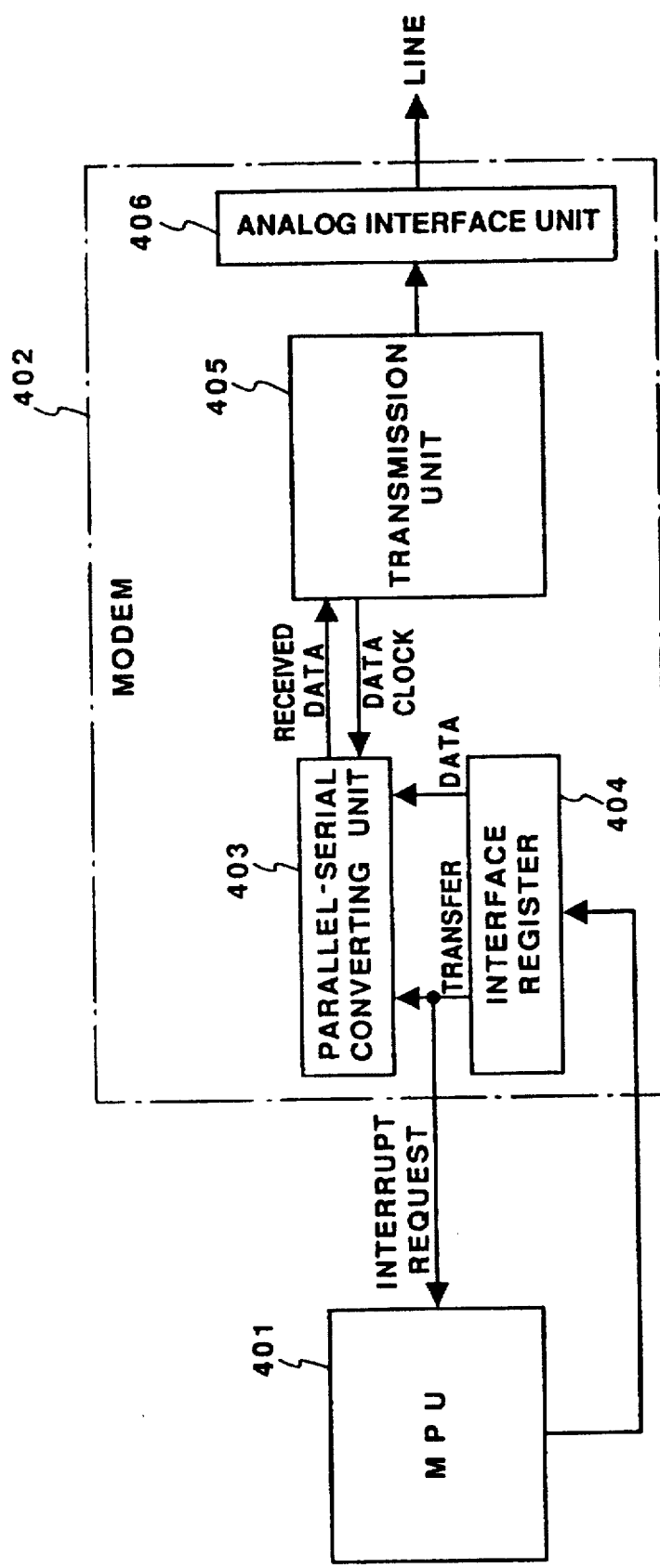
FIG. 2 is a block diagram showing a conventional structure for transmission in a facsimile machine.
Figure 3:
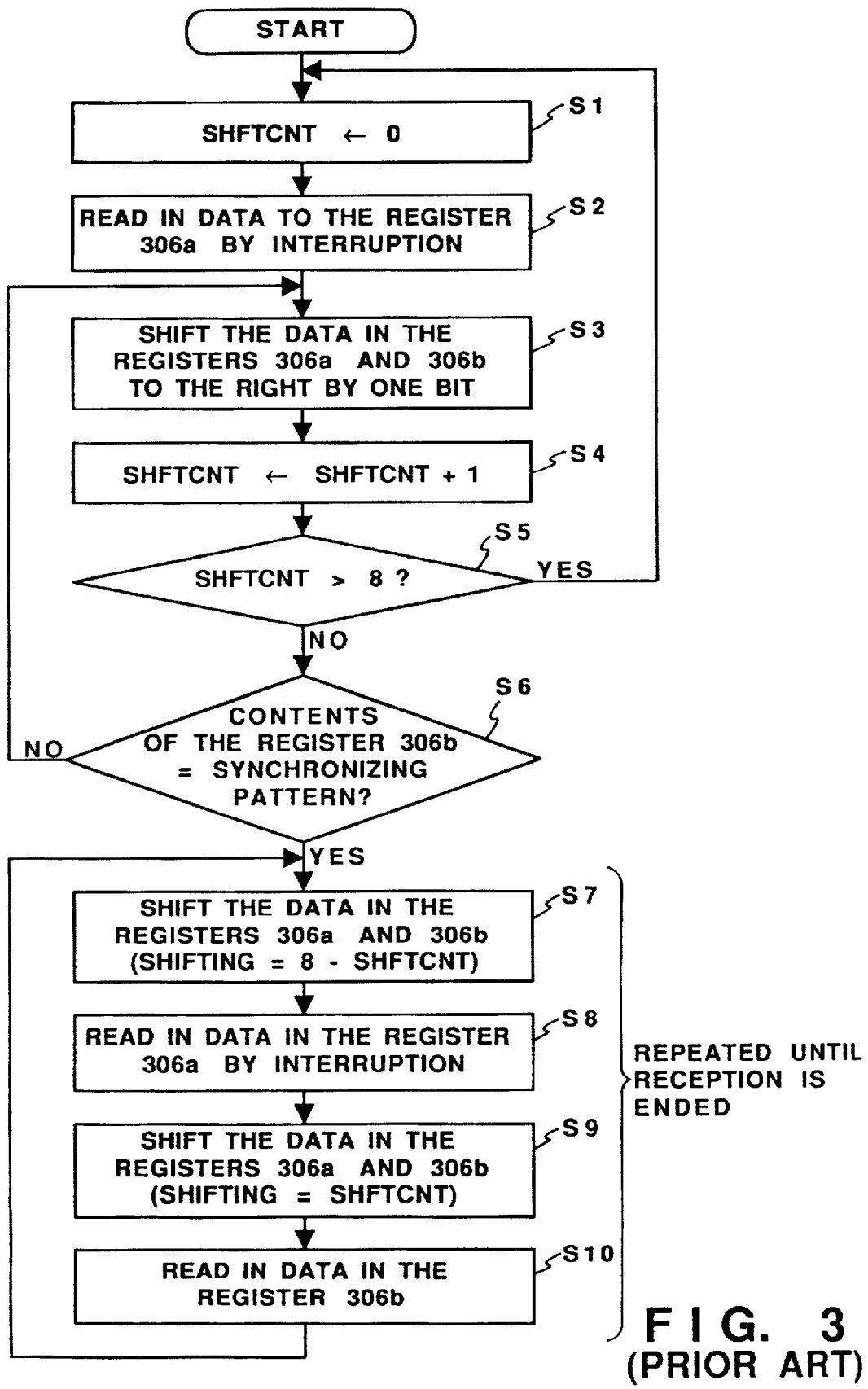
FIG. 3 is a flowchart showing the conventional reception operation.
Figure 4:
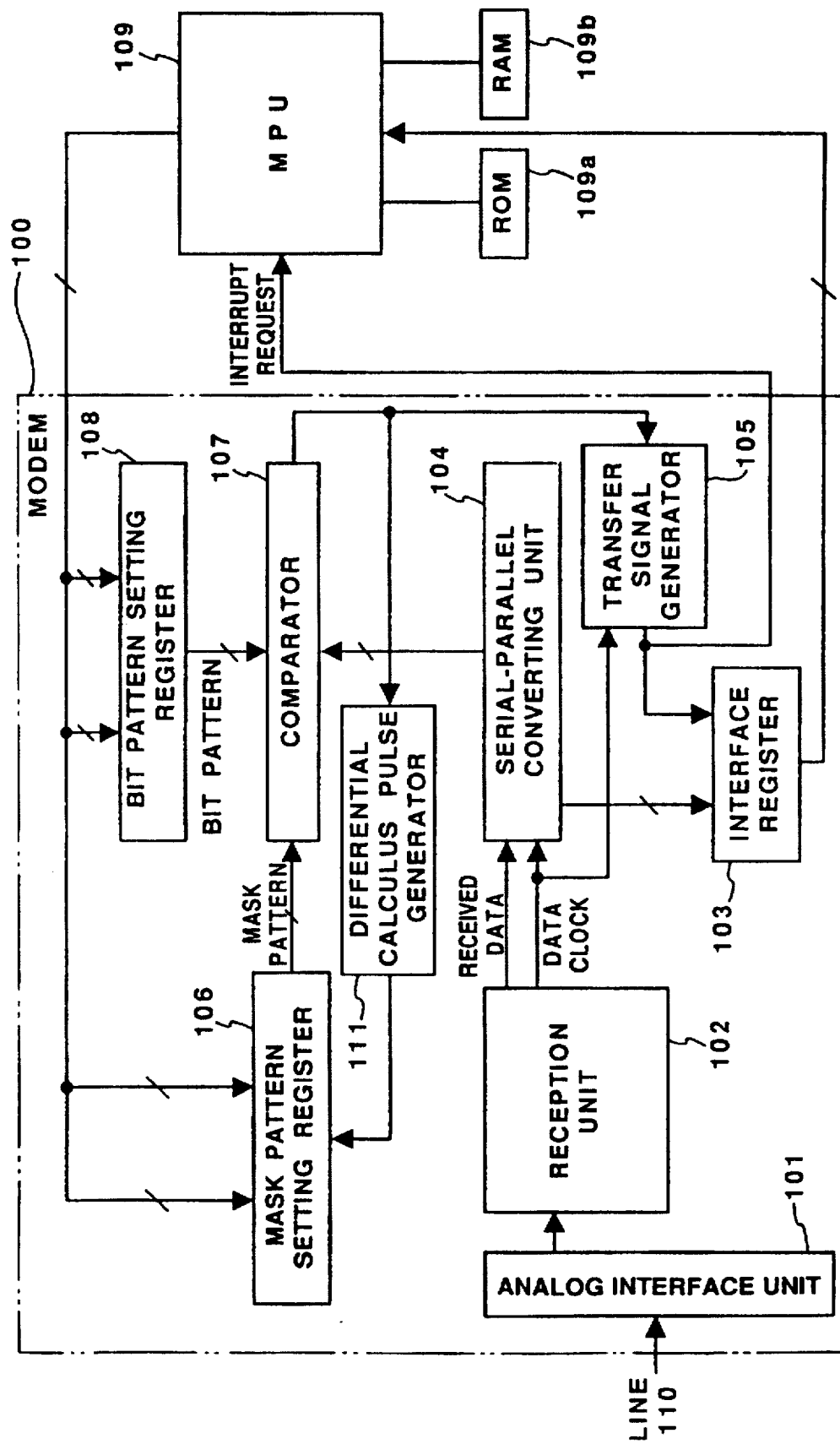
FIG. 4 is a block diagram showing the structure of a modem according to an embodiment of the present invention.

FIG. 4 is a block diagram of an embodiment of a modem according to the present invention. A modem 100 is controlled by a MPU 109. To the MPU 109 are connected a ROM 109a and a RAM 109b. The ROM 109a stores the data, such as the program executed to operate the MPU 109, shown by the flowchart of FIG. 6 which will be described later. The RAM 109b is used as the work area for the program stored in the ROM 109a. The modem 100 includes an analog interface unit 101, a reception unit 102, an interface register 103, a serial/parallel converter 104, a transfer signal generator 105, a mask pattern setting register 106, a comparator 107, a bit pattern setting register 108, and differential calculus pulse generator 111. Reference numeral 110 denotes a transmission line.

The operation of the above-mentioned structure will be described below.

The analog interface unit 101 performs a band-pass filtering and A/D conversion on a signal received from the transmission line 110. The reception signal 102 performs signal processing (including demodulation) on the received data from the analog interface unit 101, and outputs demodulated received data to the serial/parallel converter 104 synchronously with the data clocks. The parallel output from the serial/parallel converter 104 is input to the comparator 107 and to the interface register 103. The parallel data written in the interface register 103 can be read out by the external MPU 109. The output of the comparator 107 is input to the transfer signal generator 105. The output of the mask pattern setting register 106 is input to the comparator 107. The external MPU 109 can write data (mask pattern) in the mask pattern setting register 106. The mask pattern is a bit pattern which indicates an effective bits to be compared on the comparator 107. To the other input of the comparator 107 is connected the output of the bit pattern setting register 108. The MPU 109 can write data in the bit pattern setting register 108. A data clock is supplied to the reception unit 102 to the transfer signal generator 105. The output of the transfer signal generator 105, i.e., a transfer signal, is sent to the interface register 103 where it is used as the signal for writing parallel data in the interface register 103. The transfer signal is also output to the external MPU 109 as an interruption request signal. The MPU 109 starts reading in the received data (image data) from the interface register 103 in response to reception of the interrupt request signal.

The number of bits handled in the serial/parallel converter 104, the mask pattern setting register 106, the comparator 107 and the bit pattern setting register 108 is 16. The number of bits of a connection bus between the MPU 109 and the modem 100 is 8. Assuming that the facsimile reception operation is conducted in the aforementioned connection state, 8-bit data (01111110 in a binary code), called a preampble, is sent out continuously for about 1 second prior to the commands flamed by high level data link control procedures (HDLCs). Hence, the host MPU 109 must search for this bit pattern which is a 8-bit data. The operation of the MPU 109 which searches for the bit pattern will be described below.

FIG. 6 is a flowchart showing the procedures of the MPU 109 which searches for a preamble according to the present embodiment. In the following description, the bit patterns set in the bit pattern setting register 108 and in the mask pattern setting register 107 are exclusively used to search for the preamble. In another applications, another bit patterns are set by the MPU 109.

First, in S21 and S22, 01111110 (which is 7E in a hexadecimal code) is written in a binary code in both 8 bits on the least significant byte side and 8 bits on the most significant byte side in the bit pattern setting register 108.

Next, in S23 and S24, 11111111 (which is FF in a hexadecimal code) is written in a binary code in both 8 bits on the least significant byte side and 8 bits on the most significant byte side in the mask pattern setting register 106. Since the 8-bit data are sent in sequence as the preamble, 2-byte 7E7E are set in the bit pattern setting register 108.

After initialization is conducted in S21 to S24, the received data and the bit pattern, 0111111001111110, which is 7E7E in a hexadecimal code and which is the preamble, are compared with each other by the comparator 107. The 8-bit data unit received is shifted by one bit each time by the serial/parallel converter 104 in response to the data clock, by which the bit pattern on the serial/parallel converter 104 is changed. Each time the received data is changed, it is compared with the bit pattern set in the bit pattern setting register 108. If the received data and the bit pattern set in the bit pattern setting register 108 coincide with each other, the comparator 107 shown in FIG. 4 outputs a logical high signal (ON). This means that the preamble could be searched for. At that time, the transfer signal generator 105 initiates operation and generates a transfer signal for every 8 data clocks. Synchronously with generation of the transfer signal, the MPU 109 is interrupted and initiates reading in the received data from the interface register 103 (S26).

Therefore, the MPU 109, after initialization in S21 to S24, can read out the one byte of data unit as it is transmitted from the transmission side only by taking in the one byte data, which is conducted by interruption, in S25 and S26.

In the aforementioned description, since the preamble, 8 bit-data, is sent in sequence, a mask pattern indicating that all 2 bytes are effective is set.

The structure and operation of the essential parts of the embodiment will now be described.

Figure 5:
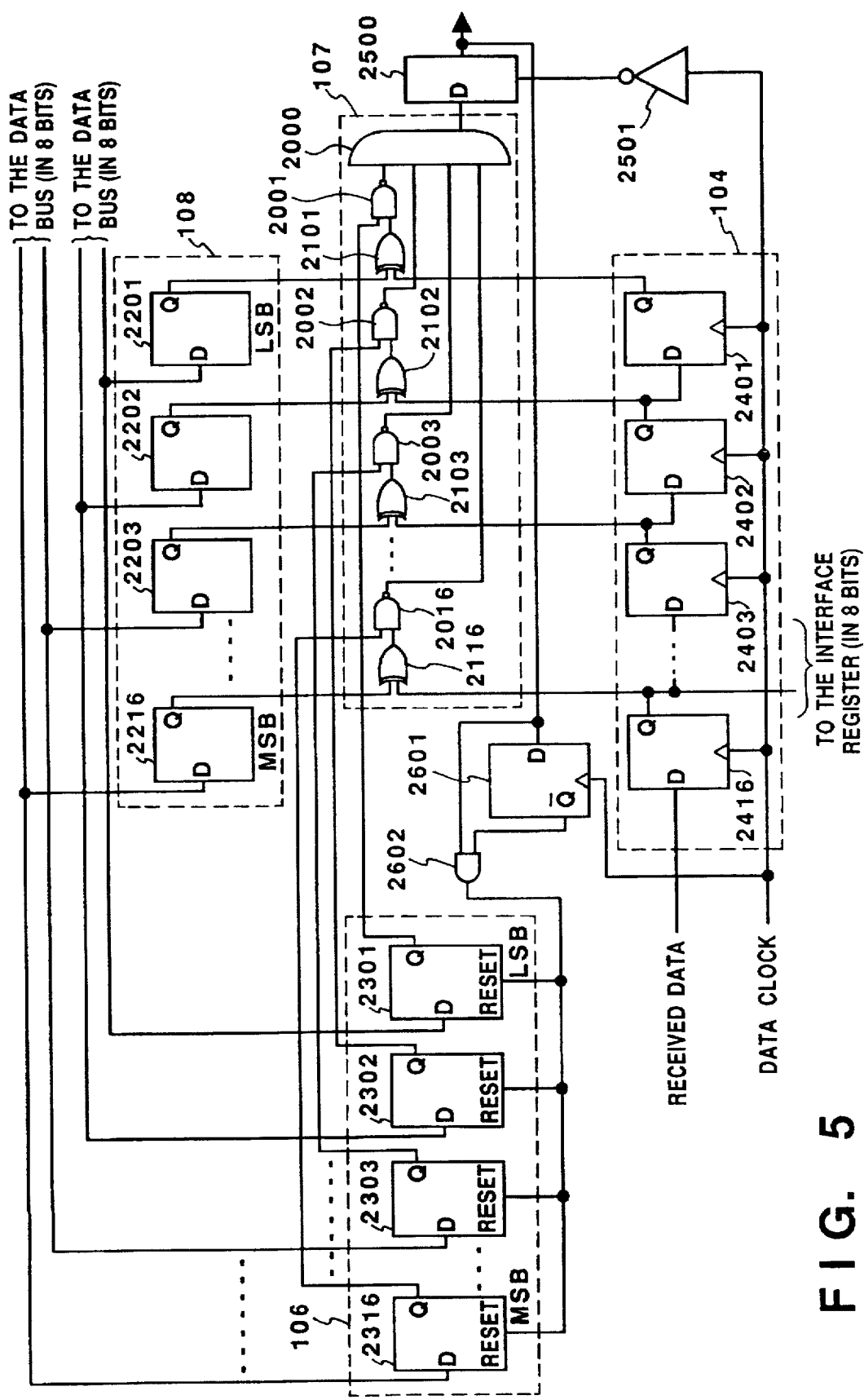
FIG. 5 is a circuit diagram showing the structure of the essential parts of the modem shown in FIG. 4.

FIG. 5 is a circuit diagram showing the structure of the essential parts of the modem 100 in detail. FIG. 5 shows the serial/parallel converter 104, the mask pattern setting register 106, the comparator 107, the bit pattern setting register 108, and pulse generator 111.

In FIG. 5, 2001 through 2116 indicate the comparator 107. In more detail, 2000 indicates an AND gate; 2001 through 2016 indicate NAND gates; 2101 through 2116 indicate EOR gates; 2201 through 2216, 2301 through 2316 and 2401 through 2416 indicate flip-flops (hereinafter referred to as FFs). The outputs of the NAND gates 2001 through 2016 are connected to the input of the AND gate 2000. The outputs of the EOR gates 2101 through 2116 are respectively connected to one inputs of the NAND gates 2001 through 2016, while the outputs of the FFs 2301 through 2316 are respectively connected to the other inputs of the NAND gates 2001 through 2016. The outputs of the FFs 2401 through 2416 are respectively connected to one inputs of the EOR gates 2101 through 2116, while the outputs of the FFs 2201 through 2216 are respectively connected to the other inputs of the EOR gates 2101 through 2116. The sixteen FFs 2401 through 2416 constitute the serial/parallel converter 104 for converting the received data into parallel data. The serial/parallel converter 104 is a shift register in which the received data is shifted by one bit each time in response to the data clock. The inputs of the sixteen FFs 2301 through 2316 are series-connected to the 8-bit data bus so that desired data can be written in by the external MPU 109. The reset inputs of the sixteen FFs 2301 through 2316 are connected to the output of an AND gate 2602. An input of the AND gate 2602 is connected to the Q̄ output of an FF 2601 and another input of the AND gate 2602 is connected to the output of an FF 2500.

The output of FF 2500 is connected to the data input of the FF 2601. A data clock is input to the clock input of the FF 2601.

Data clock inverted by an inverter 2510 is supplied to the clock input of the FF 2500.

In the bit pattern setting register 108 constituted by the FFs 2201 through 2216, the inputs of the eight FFs 2201 through 2208 and those of the eight FFs 2209 through 2216 are series-connected to the data bus so that 8-bit data can be written by the external MPU 109.

The operation of the structure mentioned above will be described below.

When the outputs of the FFs 2401 through 2416 of the serial/parallel converter 104 coincide with the corresponding outputs of the FFs 2201 through 2216 of the bit pattern setting register 108 in the effective bits set in the mask pattern setting register 106, all the outputs of the NAND gates 2001 through 2016 of the comparator 107 rise, thereby raising (ON) the output of the AND gate 2000, i.e., the output of the comparator 107. Furthermore, since the output of the AND gate 2000 is connected to all the reset terminals of the FFs 2301 through 2316 of the mask pattern setting register 106 via the pulse generator 111, the logical high level of the AND gate 2000 resets all the outputs of the FFs 2301 through 2316 to 0. Consequently, all the outputs of the NAND gates 2001 through 2016 rise, changing the data in the serial/parallel converter 104. Lowering of any one output of the EORs 2101 through 2116 fixes the output of the AND gate 2000 to "1". Therefore, the transfer signal generator 105, shown in FIG. 4, controlled by the logical high level of the output of the AND gate 2000, can output the transfer signal each time 8-bit data is received after the output of the comparator 107 has risen, that is, the MPUT 109 can keep reading out the data from the interface register 103.

The image signal reception operation conducted in a facsimile machine will be described below. FIG. 7 explains how the mask pattern and bit pattern are set in this embodiment. End of line (EOL) occurs at the beginning of an image signal. Interrupt of the MPU 109 is initiated when the bit pattern represented by this code is received.

The bit pattern of EOL is 100000000000 which is 12 bits of the beginning of an image signal. When an image signal is sent following one bit indicating one-dimensional coding scheme or two-dimensional coding scheme which in turn follows EOL, since it cannot be determined whether the added one bit is "1" or "0", 16-bit data shown in FIG. 7 are respectively set in the mask pattern setting register 106 and bit pattern setting register 108.

When the 16-bit data shown in FIG. 7 is set in the mask pattern setting register 106, even if one bit on the most significant bit side and three bits on the least significant bit side do not coincide with the reception bit pattern, the inputs of the four NAND gates 2016, 2003, 2002 and 2001, shown in FIG. 5, fall to the logical low level, thus raising the outputs of the NAND gates 2016, 2003, 2002 and 2001 to the logical high level. In each of there NAND gates, the other input, i.e., the results of the comparison between the data in the serial/parallel converter 104 and the corresponding bit pattern in the bit pattern setting register 108, do not affect the output thereof. That is, the mask pattern can be set by a combination of 12 sequential effective bits and 4 invalid bits. Hence, comparison is made by the comparator 107 on the bit pattern portion corresponding to EOL. Rise of the output of the comparator 107 indicates that EOL has been searched for. At that time, transfer of the received data to the interface register 108 at each 8 bit units begins, and output an interrupt request signal by the interface register 103 to the external MPU 109 is made possible.

The MPU 109 reads out the received data from the interface register 103 in each 8 bit units in response to reception of the interrupt request signal.

As will be understood from the foregoing description, in the demodulation device according to the present invention which is capable of outputting parallel data, 2 byte bit pattern, including the bit pattern used to synchronize reception, is set, and the bit pattern used for synchronization is made effective bits, while the bits other than that bit pattern are processed as invalid bits. 2 bytes of the received data input synchronously with the clock are compared with the aforementioned 2-byte bit pattern in every clock. When they coincide with each other, parallel output of the received data to the circuit, such as the external MPU, is made possible. In consequence, the burden of the software executed by the circuit, such as the MPU, for controlling the demodulation device can be greatly alleviated.

The facsimile has been described in the above embodiment. However, the present invention can not only be applied to the facsimile, but also other types of communication apparatus.

As many apparently widely different embodiments of the present invention can be made without departing from the spirit and scope thereof, it is to be understood that the invention is not limited to the specific embodiments thereof except as defined in the appended claims.

What is claimed is:

1. A modem device, which is controlled by an external processing device, for receiving a command and an image signal, comprising:

demodulating means for demodulating received data;

storing means for storing first and second bit patterns set by the external processing device, the first bit pattern being received with the command and the second bit pattern being received with the image signal;

detecting means for detecting coincidence of the received demodulated data and the first bit pattern, or coincidence of the received demodulated data and the second bit pattern; and output means for outputting interruption requests for requesting read-ins of the received demodulated data to the external processing device, based on the coincidence of the received demodulated data and the first bit pattern, or the coincidence of the received demodulated data and the second bit pattern detected by said detecting means.

2. The modem device according to claim 1, wherein said demodulation means outputs the demodulated received data and data clocks.

3. The modem device according to claim 2, wherein said output means outputs the interruption requests each time a predetermined number of the data clocks is outputted.

4. The modem device according to claim 1, further comprising second output means for outputting the demodulated received data to the external processing device.

5. The modem device according to claim 1, wherein said output means outputs the interruption requests at predetermined intervals after the coincidence is detected.

6. The modem device according to claim 1, wherein the first bit pattern is a preamble prior to a command frame according to a high level data link control procedure.

7. The modem device according to claim 1, wherein the second bit pattern is an end of line (EOL) provided at the beginning of an image signal.

8. A data processing method in a modem device, controlled by an external processing device, for receiving a command and an image signal, said method comprising the steps of:

storing first and second bit patterns set by the external processing device, the first bit pattern being to be received with the command and the second bit pattern being to be received with the image signal;

demodulating received data;

detecting coincidence of received demodulated data and the first bit pattern, or coincidence of the received demodulated data and the second bit pattern; and outputting interruption requests for requesting read-ins of the received demodulated data to the external processing device, based on the coincidence of the received demodulated data and the first bit pattern, or the coincidence of the received demodulated data and the second bit pattern detected in said detecting step.

9. The method according to claim 8, further comprising outputting the demodulated received data.

10. The method according to claim 8, wherein the interruption requests are outputted at predetermined intervals after the coincidence is detected.

11. The method according to claim 8, wherein the first bit pattern is a preamble prior to a command frame according to a high level data link control procedure.

12. The method according to claim 8, wherein the second bit pattern is an end of line (EOL) provided at the beginning of an image signal.

13. The method according to claim 8, further comprising:

outputting data clocks.

14. The method according to claim 13, wherein said outputting step of outputting an interruption request outputs the interruption request each time a predetermined number of the data clocks is outputted.

15. A communication system including a modem device and a processing device which controls the modem device for receiving a command and an image signal, the processing device comprising:

writing means for writing, into the modem device, a first bit pattern to be received with the command and a second bit pattern to be received with the image signal; and reading means for reading the command and image signal from the modem device in response to interruption requests outputted by the modem device, and the modem device comprising:

demodulating means for demodulating received data;

storing means for storing the first and second bit patterns;

detecting means for detecting coincidence of the received demodulated data and the first bit patter, or coincidence of the received demodulated data and the second bit pattern; and output means for outputting the interruption requests for requesting read-ins of the received demodulated data to the processing device, based on the coincidence of the received demodulated data and the first bit pattern, or the coincidence of the received demodulated data and the second bit pattern detected by said detecting means.

16. The communication system according to claim 15, wherein said demodulation means outputs the demodulated received data and data clocks.

17. The communication system according to claim 16, wherein said output means outputs the interruption request each time a predetermined number of the data clocks is outputted.

18. The communication system according to claim 15, wherein the modem device comprises second output means for outputting the demodulated received data to the processing device.

19. The system according to claim 15, wherein said output means outputs the interruption requests at predetermined intervals after the coincidence is detected.

20. The communication system according to claim 15, wherein the first bit pattern is a preamble prior to a command frame according to a high level data link control procedure.

21. The communication system according to claim 15, wherein the second bit pattern is an end of line (EOL) provided at the beginning of an image signal.

* * * * *

UNITED STATES PATENT AND TRADEMARK OFFICE
CERTIFICATE OF CORRECTION

PATENT NO.   : 5,734,684
DATED        : March 31, 1998
INVENTOR(S)  : HISAYOSHI MATSUI It is certified that error appears in the above-identified patent and that said Letters Patent is hereby corrected as shown below:

COLUMN 2

Line 34, "is" should read --are--.

COLUMN 4

Line 30, "bits" should read --bit--.

COLUMN 5

Line 46, "inputs" should read --input--.
    Line 50, "inputs" should read --input--.

COLUMN 8

Line 38, "patter," should read --pattern,--.

Signed and Sealed this

Twenty-first Day of July, 1998

Attest:

BRUCE LEHMAN

*Attesting Officer*      *Commissioner of Patents and Trademarks*